US008935566B2

(12) United States Patent
Matsui et al.

(10) Patent No.: US 8,935,566 B2
(45) Date of Patent: Jan. 13, 2015

(54) PLUG-IN CARD STORAGE DEVICE AND ERROR CORRECTION CONTROL METHOD THEREOF

(75) Inventors: Hideki Matsui, Kawasaki (JP); Kazuhiro Shibuya, Fujisawa (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 13/534,551

(22) Filed: Jun. 27, 2012

(65) Prior Publication Data

US 2013/0036325 A1 Feb. 7, 2013

(30) Foreign Application Priority Data

Aug. 5, 2011 (JP) ................. 2011-171852

(51) Int. Cl.
*G06F 11/00* (2006.01)
*G06F 11/10* (2006.01)
*G06F 11/07* (2006.01)

(52) U.S. Cl.
CPC .......... *G06F 11/1052* (2013.01); *G06F 11/076* (2013.01); *G06F 11/0793* (2013.01)
USPC ................ 714/5.1; 714/47.1; 714/42; 714/48

(58) Field of Classification Search
CPC ............ G06F 11/3031; G06F 11/3041; G06F 11/3452
USPC ...................... 714/47.1, 47.2, 47.3
See application file for complete search history.

(56) References Cited

U.S. PATENT DOCUMENTS

| | | | |
|---|---|---|---|
| 4,456,996 A * | 6/1984 | Haas et al. ..................... 714/774 |
| 5,687,036 A * | 11/1997 | Kassab ........................ 360/53 |
| 5,974,576 A | 10/1999 | Zhu |
| 6,272,651 B1 * | 8/2001 | Chin et al. ....................... 714/43 |
| 6,732,291 B1 * | 5/2004 | Kilmer et al. ................ 714/6.32 |
| 6,771,440 B2 * | 8/2004 | Smith ............................. 360/31 |
| 6,848,063 B2 * | 1/2005 | Rodeheffer et al. ........... 714/6.2 |
| 7,023,991 B1 | 4/2006 | Nakamura et al. |

(Continued)

FOREIGN PATENT DOCUMENTS

| | | |
|---|---|---|
| JP | 10-55320 | 2/1998 |
| JP | 2004-125633 | 4/2004 |

(Continued)

OTHER PUBLICATIONS

JEDEC Standard Measurement and Reporting of Alpha Particle and Terrestrial Cosmic Ray-Induced Soft Errors in Semiconductor Devices, Oct. 2006, JEDEC Solid State Technology Association 2001, Revision JESD89A, pp. 55-69.*

(Continued)

*Primary Examiner* — Scott Baderman
*Assistant Examiner* — Paul Contino
(74) *Attorney, Agent, or Firm* — Staas & Halsey LLP

(57) ABSTRACT

A plug-in card storage device includes a plug-in card including a memory to store received input data and an error correction circuit to be equipped electrically connectable to the memory and to correct an error in the input data outputted from the memory; a device main body to have the plug-in card implemented therein; and a processor to determine whether or not to activate the error correction circuit, by calculating a reliability index value of the plug-in card based on an error rate of the memory provided in the plug-in card implemented in the device main body, so as to approximate the reliability index value to a reference value.

10 Claims, 10 Drawing Sheets

(56) References Cited

U.S. PATENT DOCUMENTS

| | | |
|---|---|---|
| 8,276,018 B2 * | 9/2012 | Kursun et al. ............ 714/10 |
| 2007/0180328 A1 * | 8/2007 | Cornwell et al. ............ 714/42 |
| 2008/0082892 A1 | 4/2008 | Kushida |
| 2008/0276150 A1 | 11/2008 | Kong et al. |
| 2009/0204852 A1 * | 8/2009 | Diggs et al. ............ 714/42 |
| 2009/0276570 A1 * | 11/2009 | Cheng et al. ............ 711/115 |
| 2010/0313072 A1 * | 12/2010 | Suffern ............ 714/37 |

FOREIGN PATENT DOCUMENTS

| | | |
|---|---|---|
| JP | 2006-332920 | 12/2006 |
| JP | 2008-90419 | 4/2008 |
| JP | 2008-198020 | 8/2008 |
| JP | 2010-147801 | 7/2010 |
| JP | 2011-15278 | 1/2011 |
| WO | 01/37566 | 5/2001 |

OTHER PUBLICATIONS

MoSys adds soft-error protection, correction to 1-transistor SRAM for 'free'. EE Times. Jan. 28, 2002 [retrieved on Mar. 11, 2014]. Retrieved from the Internet <URL: http://www.eetimes.com/document.asp?doc_id=1175762>.*

Japanese Office Action dated Oct. 7, 2014 in corresponding Japanese Patent Application No. 2011-171852.

* cited by examiner

FIG. 4

| CARD INFORMATION | |
|---|---|
| TYPE | TYPE 1 |
| USED DEVICE 1 | DEVICE A |
| USED DEVICE 2 | DEVICE B |
| USED DEVICE 3 | DEVICE C |

FIG. 5

| SER DATABASE | | | | | | | |
|---|---|---|---|---|---|---|---|
| SER TABLE OF DEVICE | | | | | | | 41A |
| ITEM | | INPUTTED INFORMATION | | FAILURE RATE/FACTOR | | | |
| HARD FAILURE RATE | | – | | 300 | | | |
| LATITUDE/ALTITUDE | | NEW YORK | | 1.02 | | | |
| THICKNESS OF CONCRETE (m) | | 1 | | 0.32 | | | |
| SER TABLE OF CARD TYPE 1 | | | | | | | 41B |
| SUBJECT DEVICE | MEMORY TYPE | MEMORY CAPACITY [Mbit] | WITH OR WITHOUT ECC | SER VALUE (WITH ECC) [fit/Mbit] | SER VALUE (WITHOUT ECC) [fit/Mbit] | ERROR OCCURRENCE STATISTICS [TIMES] | ECC ON\OFF |
| HARD FAILURE RATE OF CARD TYPE 1 | – | – | WITHOUT | 2000 | – | – | OFF |
| SDRAM FOR CPU (USED IN COMMON WITH EACH CARD) | DDR2 SDRAM | 512 | WITH | 10 | 1000 | 1 | ON |
| DEVICE A | DDR2 SDRAM | 256 | WITH | 12 | 1200 | 10 | ON |
| DEVICE B | FPGA (TYPE A) | 10 | WITHOUT | 0 | 100 | 0 | OFF |
| DEVICE C | FPGA (TYPE B) | 10 | WITHOUT | 0 | 110 | 2 | OFF |
| SER TABLE OF CARD TYPE 2 | | | | | | | 41B |
| SUBJECT DEVICE | MEMORY TYPE | MEMORY CAPACITY [Mbit] | WITH OR WITHOUT ECC | SER VALUE (WITH ECC) [fit/Mbit] | SER VALUE (WITHOUT ECC) [fit/Mbit] | ERROR OCCURRENCE STATISTICS [TIMES] | ECC ON\OFF |
| HARD FAILURE RATE OF CARD TYPE 2 | – | – | WITHOUT | 1500 | – | – | OFF |
| SDRAM FOR CPU (USED IN COMMON WITH EACH CARD) | DDR2 SDRAM | 512 | WITH | 10 | 1000 | 1 | ON |
| DEVICE A | DDR2 SDRAM | 256 | WITH | 12 | 1200 | 10 | ON |
| DEVICE D | FPGA (TYPE C) | 15 | WITHOUT | 0 | 120 | 0 | OFF |

FIG. 6

| DEVICE CONFIGURATION DATABASE | | | | 42 |
|---|---|---|---|---|
| IF#1 | | | | |
| | PORT 1 | | | |
| | | IN USE/NOT IN USE | LINE CLASS | MAPPING |
| | | IN USE | OC-48 | STS-48c |
| | | CH#1-48 | | |
| | | IN USE/NOT IN USE | PATH CONNECTION DESTINATION | |
| | | IN USE | IF#4 PORT1 STS48c CH#1-48 | |
| | PORT 2 | | | |
| | | IN USE/NOT IN USE | LINE CLASS | MAPPING |
| | | IN USE | OC-48 | STS-12c |
| | | CH#1-12 | | |
| | | IN USE/NOT IN USE | PATH CONNECTION DESTINATION | |
| | | IN USE | IF#5 PORT2 STS12c CH#1-12 | |
| | | CH#13-24 | | |
| | | IN USE/NOT IN USE | PATH CONNECTION DESTINATION | |
| | | NOT IN USE | – | |
| | | CH#25-36 | | |
| | | IN USE/NOT IN USE | PATH CONNECTION DESTINATION | |
| | | IN USE | IF#5 PORT2 STS48c CH#25-36 | |
| | | CH#37-48 | | |
| | | IN USE/NOT IN USE | PATH CONNECTION DESTINATION | |
| | | NOT IN USE | – | |
| IF#2 | | | | |
| | PORT 1 | | | |
| | | IN USE/NOT IN USE | LINE CLASS | MAPPING |
| | | IN USE | OC-192 | STS-192 |
| | | CH#1-192 | | |
| | | IN USE/NOT IN USE | PATH CONNECTION DESTINATION | |
| | | IN USE | IF#6 PORT1 STS192 CH#1-192 | |
| | | ⋮ | | |

PLUG-IN CARD STORAGE DEVICE AND ERROR CORRECTION CONTROL METHOD THEREOF

CROSS-REFERENCE TO RELATED APPLICATION(S)

This application is based upon and claims the benefit of priority of the prior Japanese Patent Application No. 2011-171852, filed on Aug. 5, 2011, the entire contents of which are incorporated herein by reference.

FIELD

The embodiments discussed herein are related to a plug-in card storage device.

BACKGROUND

In the field of communication devices or information processing devices, a device having a device configuration called as "chassis type" (hereinafter, referred to as "a chassis type device") is used. The chassis type device includes a housing (may also be called as "a shelf") having a plurality of slots and a plurality of devices called as "modules" or "cards" inserted into the plurality of slots.

The "modules" or "cards" are devices (hereinafter, referred to as "a card device") having electric and electronic components, such as a semiconductor device, mounted thereon for a predetermined function. The chassis type device can exhibit an intended function by inserting the plurality of card devices into the slots and electrically connecting between card devices to integrate functions included in each card device. In the "chassis type" device, inserting (connecting) a card device into the housing enables to utilize a function contained in the card device. Therefore, the "chassis type" device is also called as a plug-in card storage device in a "plug-in system".

For example, a chassis type switch, which is one of communication devices of a chassis type, includes a housing, a card device (called as "a switch card" or "a switch fabric") responsible for a switching function that links between a card device (called as "an interface card" or "an interface module" (hereinafter, represented as an interface card (IF card))) having an interface function of the communication device and a plurality of interface cards and transfers a signal received at each interface card to an intended interface card, and a card device (referred to as "a control card") including a controller responsible for behavioral control of the switch card and the interface card.

In such a chassis type switch, a number of ports storable for chassis type switches can be increased by adding an interface card to an empty slot. Alternatively, a new function based on a new control method can be added by exchanging the control card.

In recent years, with the progress of a miniaturization technique of semiconductor circuits, soft errors in an FPGA (field-programmable gate array) or RAM (read only memory) circuit is becoming a problem. A soft error is a phenomenon in which a RAM or a logic circuit inside an LSI (large scale integration) malfunctions for some reason (for example, cosmic rays or a rays). Such a soft error is not a complete failure of the circuit and the soft error state can be resolved by resetting, for example, the power supply. In this respect, it is distinguished from "a hard error" representing a complete failure of a circuit. Such a problem of soft errors can occur for a card device mounted on a chassis type device.

As a technique related to the present application, there is a technique of stopping an FEC (forward error correction code) decoder not in use by information from a station side device sending data to reduce power consumption on a receiving side (for example, refer to Japanese Laid-open Patent Publication No. 2011-15278).

In addition, there is an integrated circuit device having an ECC function mounted thereon that can be subjected to integrated error correction code (ECC) processing to a large number of memory macros while suppressing an increase in the area (for example, refer to Japanese Laid-open Patent Publication No. 2008-90419).

Still in addition, there is a technique of providing optimal signal transmission processing by measuring properties of a transmission circuit in a reception error rate and a reception signal level of a fixed pattern signal before starting data communication to feedback the measurement result to the sending side and also to reestablish signal processing on the receiving side (for example, refer to Japanese Laid-open Patent Publication No. 2006-332920).

Yet in addition, there is a technique that is provided with a memory, a processor, an automatic error detection/correction circuit, and software monitoring occurrence of error detection and determining whether or not to issue a warning and the nature of the warning by comparing the frequency of detection with a regular frequency of soft errors to the used memory device and that issues an appropriate warning from an online memory monitoring system when a probability of occurrence of memory errors of a plurality of bits is more than a predetermined threshold (for example, refer to Japanese Laid-open Patent Publication No. 10-55320).

Further, there is a technique in which a control section controls switch timing of an optical switch and send timing of a plurality of subscriber side devices in such a manner that the optical switch does not receive an upstream communication signal from the plurality of subscriber side devices during a switching transition period from the start to finish of switching by the optical switch from a communication circuit outputting a downstream communication signal received from an optical line unit before switching to a passive optical network to a communication path outputting a downstream communication signal received from an optical line unit after switching to a passive optical network (for example, refer to Japanese Laid-open Patent Publication No. 2010-147801).

SUMMARY

According to an aspect of the invention, an apparatus includes a plug-in card including a memory to store received input data and an error correction circuit to be equipped electrically connectable to the memory and to correct an error in the input data outputted from the memory, a device main body to have the plug-in card implemented therein, and a processor to determine whether or not to activate the error correction circuit, by calculating a reliability index value of the plug-in card based on an error rate of the memory provided in the plug-in card implemented in the device main body, so as to approximate the reliability index value to a reference value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of card information memorized in a memory;

FIG. 5 illustrates an example of a data structure of an SER database;

FIG. 6 illustrates an example of a data structure of a device configuration database;

DESCRIPTION OF EMBODIMENTS

Hereinafter, a description is given to embodiments of the present disclosure with reference to the drawings. The configurations in the embodiments are exemplification and embodiments of the present disclosure are not limited to the configurations of the embodiments.

Figure 1:
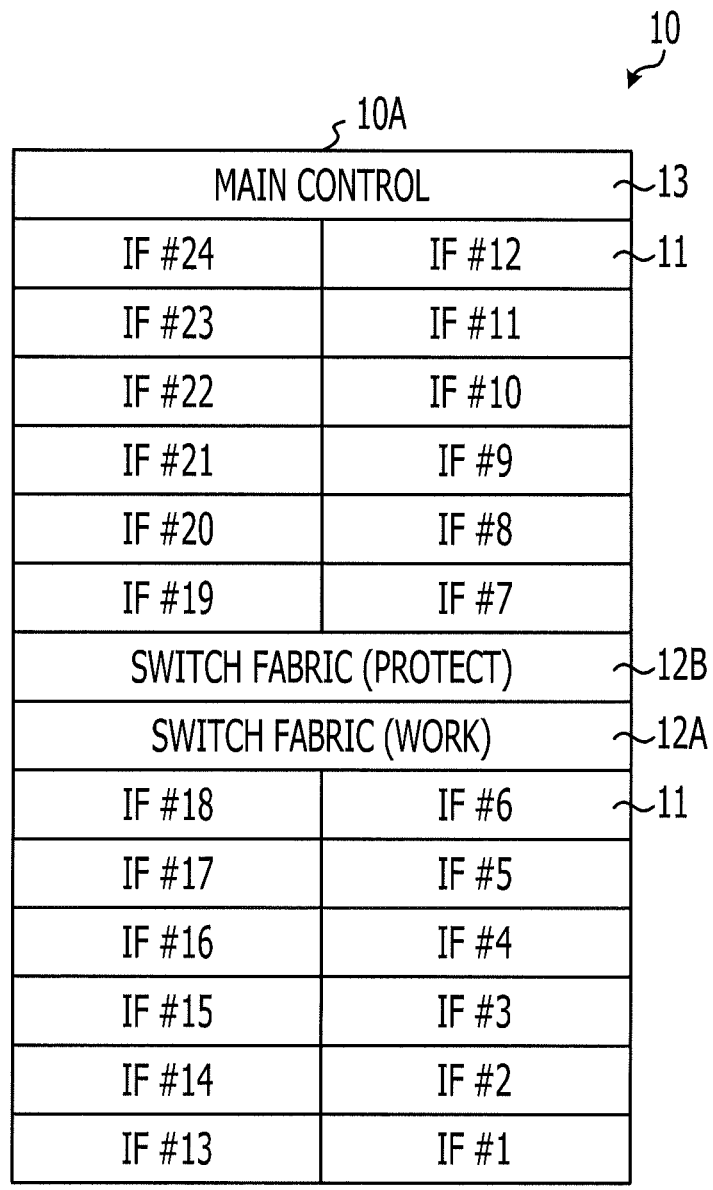
FIG. 1 schematically illustrates a configuration of a chassis type device (chassis type switch) according to an embodiment of the present disclosure.

FIG. 1 schematically illustrates a configuration of a chassis type device (plug-in card storage device) according to an embodiment of the present disclosure. In FIG. 1, a chassis type switch 10 is illustrated, which is exemplification of a chassis type device.

The chassis type switch 10 has a housing 10A as a device main body equipped with a plurality of slots and a back wiring board (BWB), not illustrated. Each slot is equipped with a connector electrically connecting a card device (plug-in card device) inserted into the slot to the BWB. Each card device connected to the BWB is electrically coupled to another card device with each other via the BWB.

The card device includes interface cards (IF cards) 11, switch fabrics (hereinafter, switch cards) 12A and 12B, and a control card (main control card) 13. As in FIG. 1, a predetermined number (24 in the example of FIG. 1) of IF cards 11 (IF #1 through IF #24), a switch card (switch fabric) 12A for a working line, a switch card (switch fabric) 12B for a protection line, and a main control card (Main Control) 13, which is a control card, are illustrated. The switch cards 12A and 12B are represented as "switch cards 12" in a case of not distinguished from each other.

The IF cards 11 (IF #1 through IF #24) are coupled in a mesh via the switch cards 12A and 12B. The IF cards 11 (IF #1 through IF #6, IF #13 through IF #18) are used for working. The IF cards 11 (IF #7 through IF #12, IF #19 through IF #24) are used for protection.

In the example of FIG. 1, the chassis type switch 10 is illustrated that can implement up to 24 of the IF cards 11. However, a number of slots included in the chassis type switch 10, a number of types of the card devices to be implemented, and a number of card devices to be implemented can be changed appropriately.

In the example of FIG. 1, the chassis type switch 10 is illustrated that has two systems of a working side and a protection side. However, the chassis type switch 10 does not have to have two systems. In other words, a chassis type switch can have a number of systems in accordance with its intention and can implement switch cards corresponding to each system.

Figure 2:
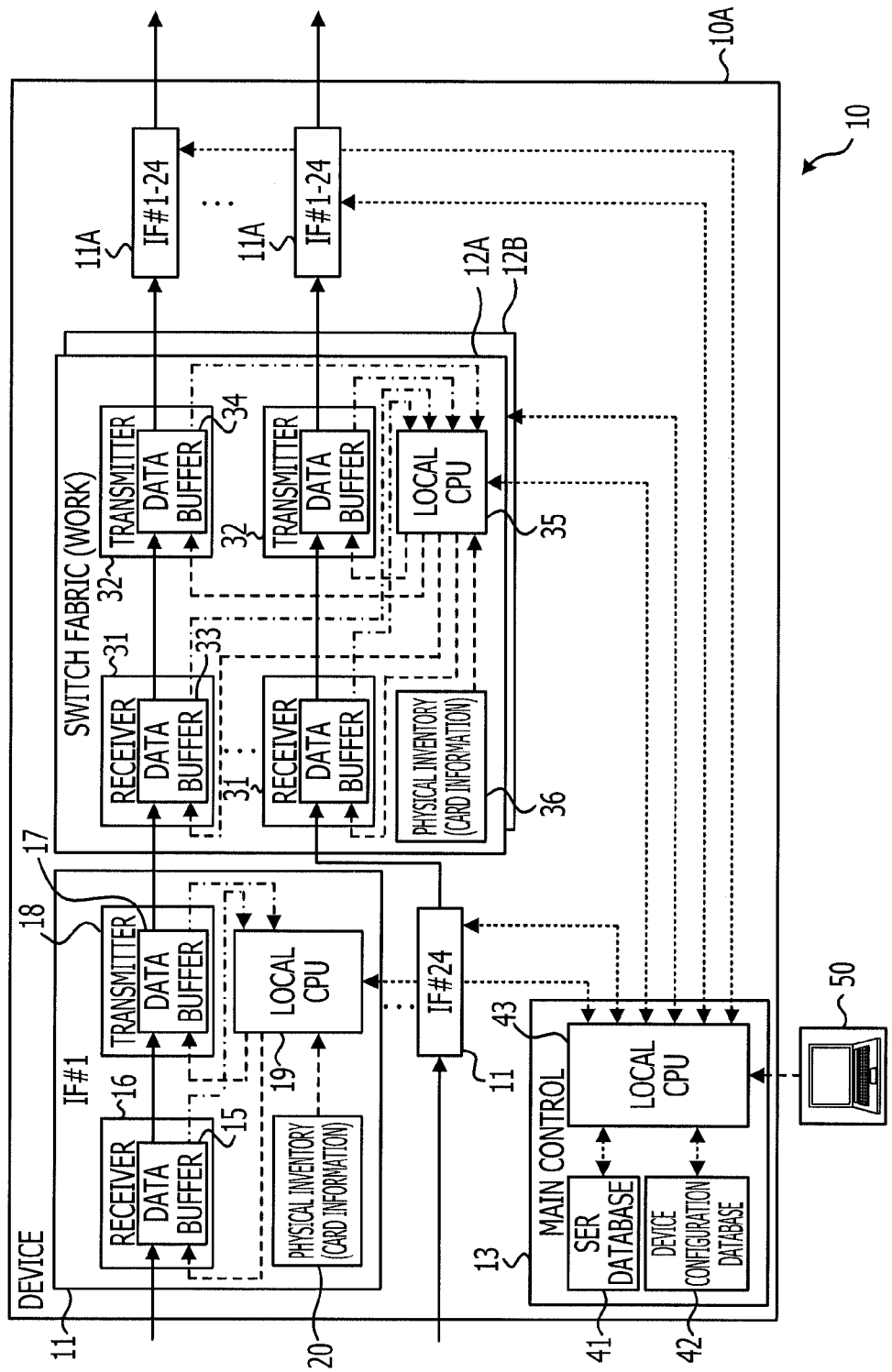
FIG. 2 illustrates an example of a circuit configuration of the chassis type device illustrated in FIG. 1.

FIG. 2 schematically illustrates an example of a circuit configuration of the chassis type device illustrated in FIG. 1. As illustrated in FIG. 2, the chassis type device (chassis type switch 10) includes the plurality of IF cards 11 (IF #1 through IF #24), the switch cards 12A and 12B, and the main control card 13 illustrated in FIG. 1. However, in FIG. 2, each IF card 11 is illustrated in a state of separating a section of sending a main signal from outside to the switch cards 12 from a section of sending a main signal inputted from the switch cards 12 to outside.

On the left of each of the switch cards 12A and 12B, the IF cards 11 (exemplified only IF #1 and IF #24) receiving a main signal are illustrated schematically. On the right of each of the switch cards 12A and 12B, IF cards 11A are illustrated schematically that receive a main signal outputted from each of the switch cards 12A and 12B.

That is, in FIG. 2, blocks of "IF #1-24" represented by the code 11A fall into any of the IF cards 11 (IF #1 through IF #24) partially illustrated on the left of the switch cards 12A and 12B.

In FIG. 2, the IF cards 11 (IF #1 is exemplified) has a plug-in card structure and includes a regular line interface section for sending and receiving a main signal and an inter-intradevice card connecting section for electrically connecting between card devices in the chassis type switch 10.

The IF cards 11 include a receiver 16 having a data buffer 15 and a transmitter 18 having a data buffer 17. To the receiver 16, a main signal received at the line interface section is inputted. The transmitter 18 receives a main signal outputted from the receiver 16 via a main signal in the card device. A main signal outputted from the transmitter 18 is outputted via the line interface section. The receiver 16 and the transmitter 18 have the data buffers 15 and 17 temporarily accumulating data of a main signal.

The data buffers 15 and 17 include a RAM circuit temporarily accumulating data of a main signal and an error correction circuit correcting soft errors in the data accumulated in the RAM circuit. Then, the data buffers 15 and 17 correct wrong data when a soft error occurs and carry out normal data processing.

Figure 3:
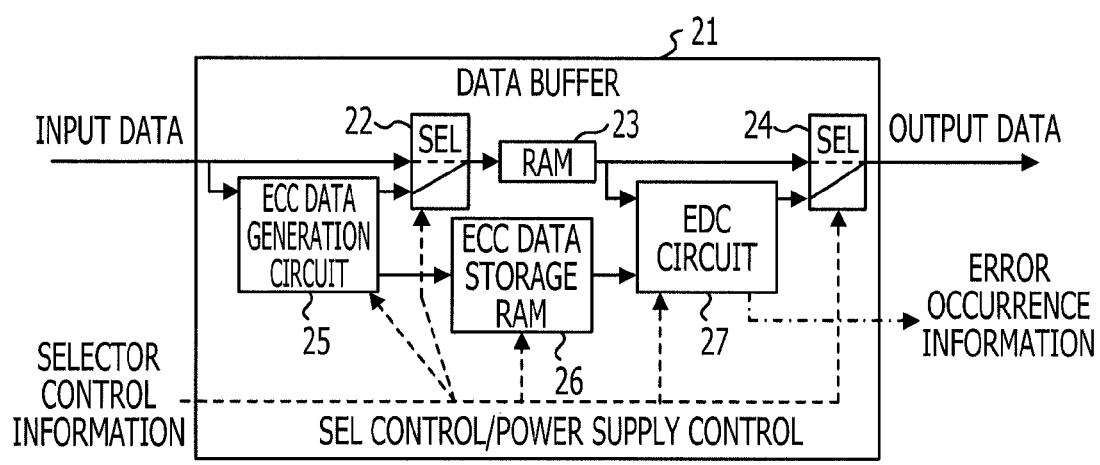
FIG. 3 illustrates an example of a circuit configuration of a data buffer included in the chassis type device illustrated in FIG. 2.

FIG. 3 illustrates an example of a circuit configuration of a data buffer 21 applicable as the data buffers 15 and 17 illustrated in FIG. 2. The data buffer 21 includes a selector (SEL) 22 disposed on a main signal line, a RAM (random access memory) 23 for accumulating data, and a selector (SEL) 24.

The data buffer 21 includes, as the error correction circuit, an error correction code (ECC) data generation circuit 25, an ECC data storage RAM 26, and an error detection and correction (EDC) circuit 27, for example. The selectors 22 and 24 are used as a switch circuit for switching between a connected state and an unconnected state of the error correction circuits and the RAM 23.

To the selector 22 and the ECC data generation circuit 25, a main signal (input data) from the main signal line is inputted. The ECC data generation circuit 25 generates ECC based on the input data.

The selector 22 outputs either one of input data from the main signal line and input data outputted through the ECC data generation circuit 25 to the RAM 23. The RAM 23 stores input data outputted from the selector 22.

The ECC data storage RAM 26 stores ECC outputted from the ECC data generation circuit 25. Input data read out from the RAM 23 is inputted to the selector 24 and the EDC circuit 27. The ECC read out from the ECC data storage RAM 26 is inputted to the EDC circuit 27.

The EDC circuit 27 carries out error detection and correction circuit (EDC) processing of the input data from the RAM 23 (check and error correction of the input data) using input data inputted from the RAM 23 and ECC inputted from the ECC data storage RAM 26. The EDC circuit 27 can check an error in data read out from the RAM 23 by using an ECC and can also correct it if the error is in 1 bit. An error in input data generated by a soft error is corrected by such EDC processing. The EDC processed input data (referred to as "corrected data") is outputted to the selector 24. The selector 24 can output one of the input data read out from the RAM 23 and the corrected data outputted from the EDC circuit 27 as output data.

According to the configuration described above, in a case of not executing EDC, the selector 22 selects input data whereas the selector 24 selects input data from the RAM 23. Thus, output data without EDC performed is outputted from the data buffer 21. In contrast, in a case of executing EDC, the selector 22 selects input data through the ECC data generation circuit 25 whereas the selector 24 selects corrected data. Thus, output data corrected by a soft error by performing EDC is outputted from the data buffer 21.

Switching control of the selectors 22 and 24 is carried out in accordance with selector control information (selector control signal) outputted from a local CPU (local central processing unit) 19 illustrated in FIG. 2. In a case of not performing EDC (error correction processing), a selector control signal (referred to as "control signal 1") for selecting input data by the selectors 22 and 24 is outputted from the local CPU 19. The selectors 22 and 24 carry out a switching behavior that selects input data by supplying the control signal 1 to the selectors 22 and 24. Meanwhile, in a case of outputting a selector control signal (referred to as control signal 2) for performing EDC from the local CPU, the control signal 2 is supplied to the selectors 22 and 24. By supplying the control signal 2 to the selectors 22 and 24, switching behaviors are carried out to respectively select input data outputted from the ECC data generation circuit 25 for the selector 22 and corrected data outputted from the EDC circuit 27 for the selector 24.

The control signals 1 and 2 described above function as a signal to turn on/off a power supply to the ECC data generation circuit 25, the ECC data storage RAM 26, and the EDC circuit 27 (error correction circuit) according to EDC processing. That is, a power supply to the error correction circuit is turned off by an input of the control signal 1 and a power supply to the error correction circuit is turned on by an input of the control signal 2. By such power supply on/off control to the error correction circuit, waste of power consumption is suppressed.

As illustrated in FIG. 2, the IF cards 11 (IF #1) includes the local CPU 19, which is a controller controlling each of the data buffers 15 and 17 and a memory (storage: memory device) 20.

The memory 20 is a non-volatile recording medium having physical inventory information (card information), such as a type of the card device or a device used for the card device.

FIG. 4 illustrates an example of card information memorized in the memory 20. The card information is read out by the local CPU 19.

The IF cards 11 (IF #2 through IF #24) include components substantially same as the components included in the IF cards 11 (IF #1) (refer to FIG. 3). Therefore, a description for an internal configuration of the IF cards 11 (IF #2 through IF #24) is omitted. Between the IF cards 11, the RAMs 23 included in the data buffers 15 and 17 do not have to have an identical structure, shape, and capacity. Although each of the IF cards 11 include a receiver and a transmitter (including respective data buffers) to process a main signal received from the switch cards 12A or 12B, they are omitted from the illustration.

As illustrated in FIG. 2, the switch card 12A includes a plurality of receivers 31 to receive an output signal (main signal) from each of the IF cards 11 (IF #1 through IF #24) and a plurality of transmitters 32 receiving a main signal outputted from the receivers 31. The receivers 31 and the transmitters 32 can have a configuration approximately similar to the receiver 16 and the transmitter 18 included in the IF cards 11. Data buffers 33 and 34 included in each of the receivers 31 and the transmitters 32 have a configuration approximately similar to a configuration included in the data buffer 21 illustrated in FIG. 3. Hereinafter, in a case of not distinguishing the data buffers 15, 17, 33, and 34, an expression of "data buffers 21" is used.

The switch card 12A further includes a local CPU 35 controlling a behavior of each of the receivers 31 and each of the transmitters 32 and a memory (storage: memory device) 36 having physical inventory information (card information) memorized therein. The local CPU 35 is coupled to each of the receivers 31 and each of the transmitters 32 through a control line, and controls cross connect processing to a main signal (input data) inputted from each of the IF cards 11. The local CPU 35 carries out reading out of card information stored in the memory 36. In the memory 36, similar to the memory 20, card information (FIG. 4) is stored that includes device information representing type information and a mounting device of the switch card 12A. The switch card 12B has a configuration approximately similar to that of the switch card 12A.

The main control card 13 can communicate with the local CPU 19 of the each IF card 11 and the local CPU 35 of each switch card 12, and also includes a local CPU 43 sending various instructions to each of the local CPUs 19 and 35.

The main control card 13 includes a device configuration database 42 with information desired for a configuration of the device, such as card implementation information or inter-card connection configuration information, controllable by the local CPU 43 and an SER database 41 storing information desired for calculation of an SER value of each card device. Each of the databases 41 and 42 are created on a non-volatile recording medium, such as a hard disk or a flash memory. The local CPU 43 calculates an SER value based on information accumulated in the SER database 41.

The main control card 13 is coupled to an external terminal 50 (for example, a personal computer (PC)) that allows an operator (maintenance personnel and the like) to input information from outside of the chassis type switch 10. The information inputted from the external terminal 50 is managed by the main control card 13. For example, at least a portion of the inputted information is stored in the databases 41 and 42 described above.

As described above, the IF cards 11 and the switch cards 12 have data buffers 21 including the RAM circuit (RAM 23)

and is further provided with an error correction circuit to correct soft errors, and thus can correct wrong data due to a soft error.

However, there are following problems in using an error correction code, such as ECC: (1) an increase in power consumption due to the addition of an error correction circuit; (2) in a case that there is an upper limit in a data slew rate, a decrease in a slew rate (transmission rate) of actual data due to assignment of an error correction code; and (3) an increase in latency (delay) caused by error correction processing.

Therefore, it is preferred to minimally suppress implementation of an error correction circuit. In a network device, such as a chassis type switch in the embodiment, it is preferred to satisfy the reliability as a network device or a network service level (line quality). Accordingly, the chassis type device is preferably provided with a soft error handling mechanism that can secure a desired service level.

Further, SER varies by the following circumstances (variation factors). <1> SER depends on a type of the memory (RAM). In particular, the probability of a multi-bit concurrent error (multi-bit error) after error correction handling depends largely on a type of the memory. <2> In a system of a plug-in card (chassis type device), an implemented card type differs for each system. SER of the entire device differs due to a difference in a combination of implemented cards. <3> SER is dependent on installation environmental parameters (latitude, longitude, altitude, shielding of a building, an amount of dispersion of cosmic neutron rays) of an actual chassis type device. <4> An SER value in operation is determined by a capacity of the actually working circuit.

Accordingly, behaviors of the soft error handling mechanism (error correction circuit) are preferably optimized by an operation status of the network system (chassis type device). By performing optimization, an excessive behavior of the soft error handling mechanism is suppressed to enable a decrease in power consumption.

The SER database 41 and the device configuration database 42 store information to optimize behaviors of the error correction circuit. The local CPU 43 controls turning on/off of a behavior (power supply) of the error correction circuit in the data buffer 21 of each card device based on the information stored in each of the databases 41 and 42. Thus, in the entire chassis type device (chassis type switch 10), optimized soft error handling (error correction processing) is performed while an increase in power consumption can be suppressed. Hereinafter, a description is given to a data structure example of the SER database 41 and the device configuration database 42 and processing of the local CPU 43.

FIG. 5 illustrates an example of a data structure of the SER database 41. As illustrated in FIG. 5, the SER database 41 includes an SER table 41A of the entire (device) chassis type device (chassis type switch 10) and an SER table 41B per card type.

The SER table 41A stores a failure rate of hardware of the device, a factor (latitude/altitude factor) to an installation position (latitude/altitude) of the device, and a factor (shielding factor) to a thickness of a shielding (concrete).

In the SER table 41B per card type, information of a failure rate of hardware in accordance with a type of each card device is stored. In addition, the SER table 41B can store information related to a memory type, a memory capacity, with or without ECC, an SER value (with ECC), an SER value (without ECC), error occurrence statistics, and turning on/off of ECC relative to an SDRAM (synchronous dynamic random access memory) for a local CPU in common among the card devices and to each device mounted on the card devices.

As illustrated in the SER table 41B in FIG. 5, an error correction circuit as described using FIG. 3 is also applicable to an SDRAM (main memory: not illustrated) for a local CPU (19, 35) of the card devices. That is, in a case that a card device has a plurality of memories (RAMs), an error correction circuit can be equipped for each RAM. In other words, a card device can have one or more of error correction circuits.

Upon creation of each SER table 41B, the local CPU 43 of the main control card 13 sends an instruction for supplying card information to the local CPUs 19 and 35 of each IF card 11 and each switch card 12. In accordance with the supply instruction, each of the local CPUs 19 and 35 reads out card information from the memories 20 and 36 and sends it to the local CPU 43. The local CPU 43 creates the SER table 41B in accordance with the card information received from each card device in the SER database 41.

In a case that information as illustrated in FIG. 5 is stored in the SER database 41, a soft error occurrence rate, a card failure rate, an average failure time [years] relative to a card device of, for example, Type 1 are calculated based on the following Equations 1 through 3 by the local CPU 43.

$$\text{Soft error occurrence rate (SER)} = (\text{Memory capacity} * \text{SER value}) * (\text{Latitude/altitude factor}) * \text{Shielding factor} = ((512*10)+(256*12)+(10*100)+(10*110))*1.02*0.32 = 3000 \text{ [fit]} \quad \text{(Equation 1)}$$

$$\text{Card failure rate} = \text{Hardware failure rate} + \text{Soft error occurrence rate} = (300+2000)+3000 = 5300 \text{ [fit]} \quad \text{(Equation 2)}$$

$$\text{Average failure time [years]} = (1000000000/\text{Failure rate})/24/365 = (1000000000/5300)/24/365 = 21 \text{ [years]} \quad \text{(Equation 3)}$$

Here, a time desired for the chassis type switch 10 to provide an adequate network service set by the chassis type switch 10 in advance is defined as a reference value (desired value). When the reference value is "15 years", for example, an error correction circuit at any location of the chassis type switch 10 can be turned off.

The above calculation describes an example in which a condition of turning on/off an error correction circuit is determined by comparing the average failure time with the reference value. Alternatively, the condition of turning on/off an error correction circuit can be determined using the soft error occurrence rate (SER) or the card failure rate as a value to be compared with the reference value.

The SER, the card failure rate, and the average failure time described above are reliability index values relative to a system as a switch formed by the chassis type switch 10. For example, when an index value of the card failure rate or the average failure time is less than a reference value, the system may not satisfy the reliability. Meanwhile, when an index value of the card failure rate or the average failure time largely exceeds a reference value, excessive error correction processing may be performed. Accordingly, when the index value falls within a range recognized to satisfy a reference value, it becomes in a state of securing system reliability and also not executing excessive error correction processing.

FIG. 6 illustrates an example of a data structure of the device configuration database 42. As illustrated in FIG. 6, in the device configuration database 42, information related to the configuration of each card device implemented in the chassis type switch 10 is stored. In the example illustrated in FIG. 6, for Ports 1 and 2 included in the IF cards 11 (IF #1, IF #2), information related to in use/not in use, a line type, and a mapping destination is stored. Further, in the device configuration database 42, information related to in use/not in use and a path connection destination relative to a respective channel (channel group) provided in Ports 1 and 2 is stored.

Next, a description is given to a behavioral example of the chassis type switch 10. Firstly, an operator (for example, maintenance personnel) inputs device configuration information, inter-card connection information, a latitude/altitude factor, and a building structure shielding rate to the chassis type switch 10 using the external terminal 50 (Phase 1).

Then, the local CPU 43 of the main control card 13 constructs the device configuration database 42 having the device configuration information and the inter-card connection information inputted from the external terminal 50 registered therein (Phase 2).

Subsequently, the local CPU 43 of the main control card 13 outputs instructions to the local CPUs 19 and 35 of each IF card 11 and each switch card 12 based on the contents stored in the device configuration database 42. Thus, setting of connection information of data paths of each IF card 11 and the switch cards 12A and 12B is carried out (Phase 3).

In each IF card 11 and each switch card 12 having received an instruction, the local CPUs 19 and 35 set all error correction circuits including error correction circuits in the data buffers 21 to be turned on (active) (Phase 4).

The local CPUs 19 and 35 of each IF card 11 and each switch card 12 read out card information from the memories 20 and 36 and send it to the local CPU 43 of the main control card 13 (Phase 5). The card information includes type information and device information of the card device. The type information includes a hardware failure rate (hard error rate) of the card device. The device information includes, as illustrated in FIG. 5, a memory type, a memory capacity, with or without ECC, an SER value (with ECC), an SER value (without ECC), and information of turning on/off an ECC circuit.

The local CPU 43 of the main control card 13 obtains intra-card device connection information from the device configuration database 42. The local CPU 43 constructs the tables 41A and 41B of the SER database 41 for each card type based on the card information informed from each IF card 11 and each switch card 12, the hardware failure rate inputted by a maintenance personnel, the latitude/altitude factor, and the building structure shielding factor (Phase 6).

Using the information registered in the SER database 41, the local CPU 43 obtains a soft error occurrence rate, a card failure rate, and "an average time until a next failure (average failure time)", which is an inverse of the card failure rate, for each card device and compares them with a reference value (desired value) of the chassis type switch 10 prepared in advance (Phase 7). In behavioral example 1, an example of comparing an average failure time as a reliability index value with a reference value thereof is described.

That is, the local CPU 43 refers to the corresponding SER table 41B for one (for example, Type 1) of the card types. Then, the local CPU 43 calculates "a number of bits in use (memory capacity)×a soft error occurrence rate per bit" for the respective memories included in each device (SDRAM for the local CPU and devices A, B, and C) provided in the card device (refer to Equation 1 described above) and obtains a total of soft error occurrence rates (SER) in the card devices. At this time, since it is a premise that all error correction circuits (error correction processing) are turned on, an SER value (with ECC) is applied to the devices with an error correction circuit added thereto and an SER value (without ECC) is applied to the devices without an error correction circuit added thereto. Subsequently, the local CPU 43 obtains the card failure rate by adding a total of SERs and the hardware failure rate (a sum of a hardware failure rate of the device and a hardware failure rate of the card device) registered in the table 41A (refer to Equation 2). Further, the local CPU 43 obtains "an average time until a next failure (average failure time)" based on Equation 3 and compares the average failure time with a reference value (desired value) set in advance.

In a case that a value of the average failure time is more than the reference value, the local CPU 43 determines that the error correction circuit (error correction processing) included in the card device of Type 1 can be turned off. In this case, the local CPU 43 sets the error correction circuit relative to at least one device in the card device to be turned off and recalculates the SER, the card failure rate, and the average failure time described above to carry out comparison with the reference value. In such a manner, the condition of turning on/off an error correction circuit is determined so as to be a reference value or a value closest to the reference value within a range that the average failure time does not become less than the reference value (Phase 8). The behaviors in Phases 7 and 8 are executed for each card type.

In a case of determining the condition of turning on/off an error correction circuit per card type, the local CPU 43 sends control information representing turning on/off of an error correction circuit provided in the card device to the local CPUs 19 and 35 of each IF card 11 and each switch card 12. Each of the local CPUs 19 and 35 inputs selector control information (selector control signal) in accordance with the control information to the data buffers 21. Here, when the selector control signal is the control signal 1, it becomes in a state of not performing error correction processing in a switching behavior of the selectors 22 and 24 whereas the power supply of the error correction circuit becomes turned off. In contrast, when the selector control signal is the control signal 2, the power supply of the error correction circuit becomes turned on and it becomes in a state of performing error correction processing of the selectors 22 and 24. As a matter of fact, it is also possible to turn off error correction processing by the error correction circuit in a state of the power supply being turned on.

Figure 7:
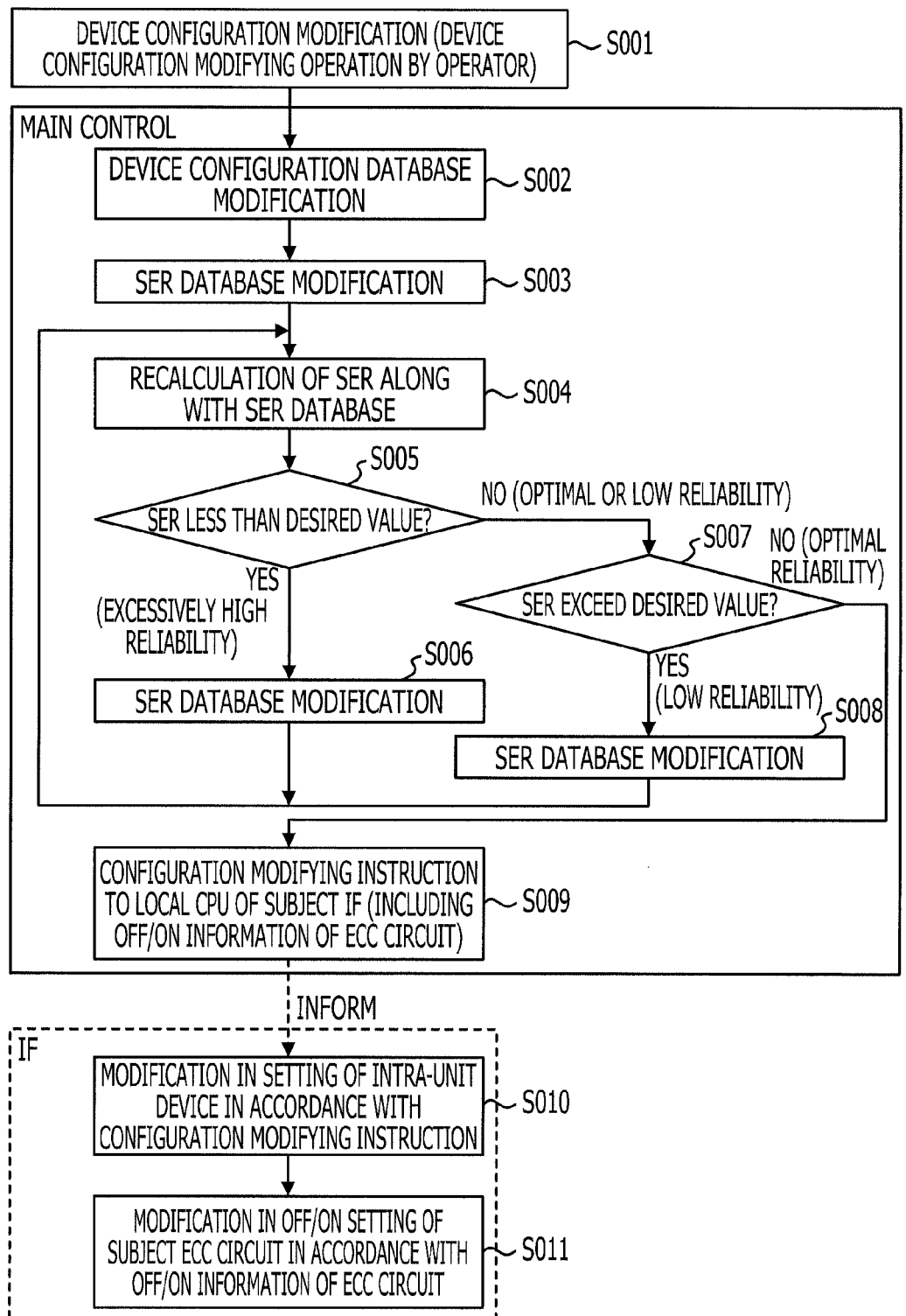
FIG. 7 is a flowchart representing a behavioral example of a first embodiment.

Next, behavioral example 2 of a first embodiment is described. FIG. 7 is a flowchart representing behavioral example 2. It is a premise of the behaviors represented in the flowchart that the SER database 41 and the device configuration database 42 are already constructed and that an operation of optimized control of turning on/off of an error correction circuit is actually carried out.

In behavioral example 2, an example of comparing a soft error occurrence rate (SER), not an average failure time, as the reliability index value with a reference value (desired value) is described. The flowchart represented in FIG. 7 represents processing only related to the IF card for the modification.

A modification in the device configuration occurs in a case of connecting a new IF card 11 to the chassis type switch 10 or occurring a modification in a setting (for example, a setting (in use/not in use) of a port or a channel for the IF card 11) relative to an existing IF card 11.

In a case of occurring a modification in the device configuration, an operator (maintenance personnel) of the external terminal 50 carries out a device configuration modifying operation to the external terminal 50 and inputs information of the device configuration related to the modification. The information of the device configuration related to the modification is supplied to the local CPU 43 of the main control card (Main Control) 13 (S001).

Then, the local CPU 43 accesses the device configuration database 42 and reflects the information of the device configuration related to the modification to the device configuration database 42. That is, the local CPU 43 carries out creation of a new table (when connecting a new IF card) or edition (addition, modification, or deletion) of an existing table (when modifying an IF card setting) using the information of the device configuration related to the modification. Thus, the device configuration of an IF card 11 related to the modification, that is, in use/not in use of a port or a channel, a line class, path connection information, and the like are reflected to the device configuration database 42 (S002).

Next, the local CPU 43 reflects the modification in the device configuration database 42 to the SER database 41. Thus, registration (addition to the table 41B) of information related to the new IF card (card type) and modification in the contents stored in a predetermined table 41B occur. In a case of adding a new table 41B, all error correction circuits included in a card type thereof (new IF card) are set to be turned on (S003).

Next, the local CPU 43 recalculates the SER (soft error occurrence rate) of the card type (IF card 11) related to the modification in accordance with an update of the SER database 41 (S004). Next, the local CPU 43 determines whether or not the SER is less than a desired value (reference value) prepared in advance (S005).

At this time, when the SER is less than a desired value, the local CPU 43 modifies the SER database 41 (S006). That is, in a case that the SER is less than a desired value, it is in a state of securing excessive reliability, so that it is preferred to suppress power consumption by turning off an undesired error correction circuit (ECC circuit). Therefore, the local CPU 43 sets at least one error correction circuit in the IF cards 11 to be turned off. At this time, as illustrated in the table 41B in FIG. 5, in a case that an error occurrence statistics value (error occurrence number) on a device basis is registered in the table 41B, the local CPU 43 determines the error correction circuits to set to be turned off in the order of a smaller error occurrence statistics value.

As the processing in S006 finishes, the processing goes back to S004 and recalculation of the SER is carried out. At this time, as an SER value per bit related to the device corresponding to the error correction circuit set to be turned off in S006, an SER value (without ECC) is applied. In S005 after that, when determined as No, the processing goes on to S007. The determination of No represents that the reliability is optimal (the SER is equivalent to the reference value) or that the reliability is low.

In S007, the local CPU 43 determines whether or not the SER is more than a desired value. At this time, in a case that the SER is more than the desired value (Yes), the processing goes on to S008.

In S007, that the SER is more than a desired value means that the reliability is lower than desired. Therefore, the local CPU 43 carries out modification of the SER database 41 and switches at least one error correction circuit in a state of being turned off to a state of being turned on (S008). At this time, in a case that an error occurrence statistics value (error occurrence number) per device is registered, the local CPU 43 sets the error correction circuit to be turned on in the order of a smaller error occurrence statistics value.

As the processing in S008 finishes, the processing goes back to S004 to carry out recalculation of the SER. At this time, as an SER value per bit related to the device corresponding to the error correction circuit set to be turned on in S008, an SER value (with ECC) is applied. After that, the processing goes on to S005.

In S007, in a case of being determined as No, the processing goes on to S009. The determination of No represents that the reliability is optimal. The desired value may be one value and may also be a range of a plurality of consecutive values.

As the processing goes on to S009, the local CPU 43 sends a configuration modifying instruction to the local CPU 19 of the IF card 11 related to the modification (target IF card). The configuration modifying instruction includes information of turning on/off each error correction circuit (ECC circuit) included in the target IF card.

In the target IF card, the local CPU 19 carries out modification in a setting of a device in the target IF card in accordance with the configuration modifying instruction received from the main control card 13 (S010). In accordance with the information of turning on/off the ECC circuit, setting of turning on/off of the subject ECC circuit is modified (S011).

According to the first embodiment, the local CPU 43 of the main control card 13 collects card information from each card device and constructs the SER database 41 together with the hardware failure rate, the latitude/altitude factor, and the shielding factor of the device inputted from a maintenance personnel.

Further, the local CPU 43 obtains an average failure time per card type using the information stored in the SER database 41 and determines turning on/off of an error correction circuit for each card type in such a manner that the average failure time becomes a reference value or a value closest to the reference value within a range of the reference value or more. Then, the local CPU 43 supplies the control information representing the determined turning on/off of an error correction circuit to each card device. Thus, the power supply of the error correction circuit specified by the control information becomes turned off.

Accordingly, the following effects can be exhibited. (1) In a plug-in card device (chassis type device) in a diverse state of implementing/using a card, system behaviors with optimal reliability considering the installation environmental conditions of the device, implementation card conditions, and the like is enabled. That is, the power supply of the error correction circuit becomes turned off within a range of satisfying a reference value to provide an adequate service desired for the chassis type switch 10, so that the reliability is secured. (2) Within a range of securing the reliability, a behavior or a power supply of the error correction circuit can be turned off in such a manner that undesired error correction processing is not executed. Thus, the power consumption can be reduced (waste of the power consumption is tried to be reduced). (3) Undesired error correction processing is bypassed (the main signal does not pass through a route related to the error correction processing), so that an increase in a data transmission delay can be minimized. (4) In a case that the plug-in card device is provided with a plurality of memories, the reliability index values of the plug-in card is calculated based on respective error rates of the plurality of memories and an installation environmental parameter of the plug-in card storage device. According to this method, since the reliability index values of the plug-in card is calculated using the respective error rates of the plurality of memories, even in a case that error rates of a portion of the memories are high, it becomes easier to be approximated to the reference value. As a result, behaviors of the error correction circuit can be optimized. In addition, by calculating the reliability index values based on the installation environmental parameter of the plug-in card storage device, the reliability index values can be corrected considering factors, such as radiation, affecting the SER. Therefore, the precision of the reliability index values can be improved.

In the first embodiment, determination on the condition of turning on/off an error correction circuit is described for the example to be made for each card type. For example, in a case that the IF cards are of Type 1 and the switch cards are of Type 2, control of turning on/off Type 1 is applicable to all IF cards similarly, and control of turning on/off Type 2 is applicable to all switch cards similarly. In contrast, in a case that the card types are different among the IF cards and the switch cards, control of turning on/off different in accordance with the card type is carried out among the IF cards and among the switch cards. In a case that a card type is different for each card device, the control of turning on/off becomes equivalent to be executed for each card device. In a case of carrying out control of turning on/off for each card, using a card ID, for example, instead of the card type, it can be altered so as to carry out determination of a condition of turning on/off on a card ID basis.

In a case that a chassis type switch has a redundant configuration as the switch cards 12A and 12B of the chassis type switch 10 in the first embodiment, the power supply of the error correction circuit to a card device in a backup system may also be turned off and, taking switching the currently used system into the backup system as an opportunity, setting of a condition of turning on/off of the error correction circuit as described in the first embodiment may also be carried out to the card device in the backup system. That is, settings of a condition of turning on/off a card device in a currently used system only may also be carried out.

Next, a second embodiment of the present disclosure is described. The second embodiment has some points in common with the first embodiment, so that differences are mainly described and the points in common are omitted from the description.

In the second embodiment, the EDC circuit 27 (FIG. 3) provided in the data buffers 21 includes an error detection state display register, not illustrated. The error detection state display register has a flag representing presence of detection of a soft error in a predetermined time. The EDC circuit 27 sets the flag to be on in a case of detecting a soft error. The flag is cleared in a period in accordance with the predetermined time (initial state: off).

Each of the local CPUs 19 and 35 of the IF cards 11 and the switch cards 12 carry out reading out of the error detection state display register in the period described above. The local CPUs 19 and 35 send an error occurrence notification to the local CPU 43 of the main control card 13 in a case that the flag is on.

When receiving the error occurrence notification, the local CPU 43 updates (increments (adds 1)) a column (error statistics counter) of error occurrence statistics of a corresponding device in the SER table 41B corresponding to the error occurrence notification.

Figure 8:
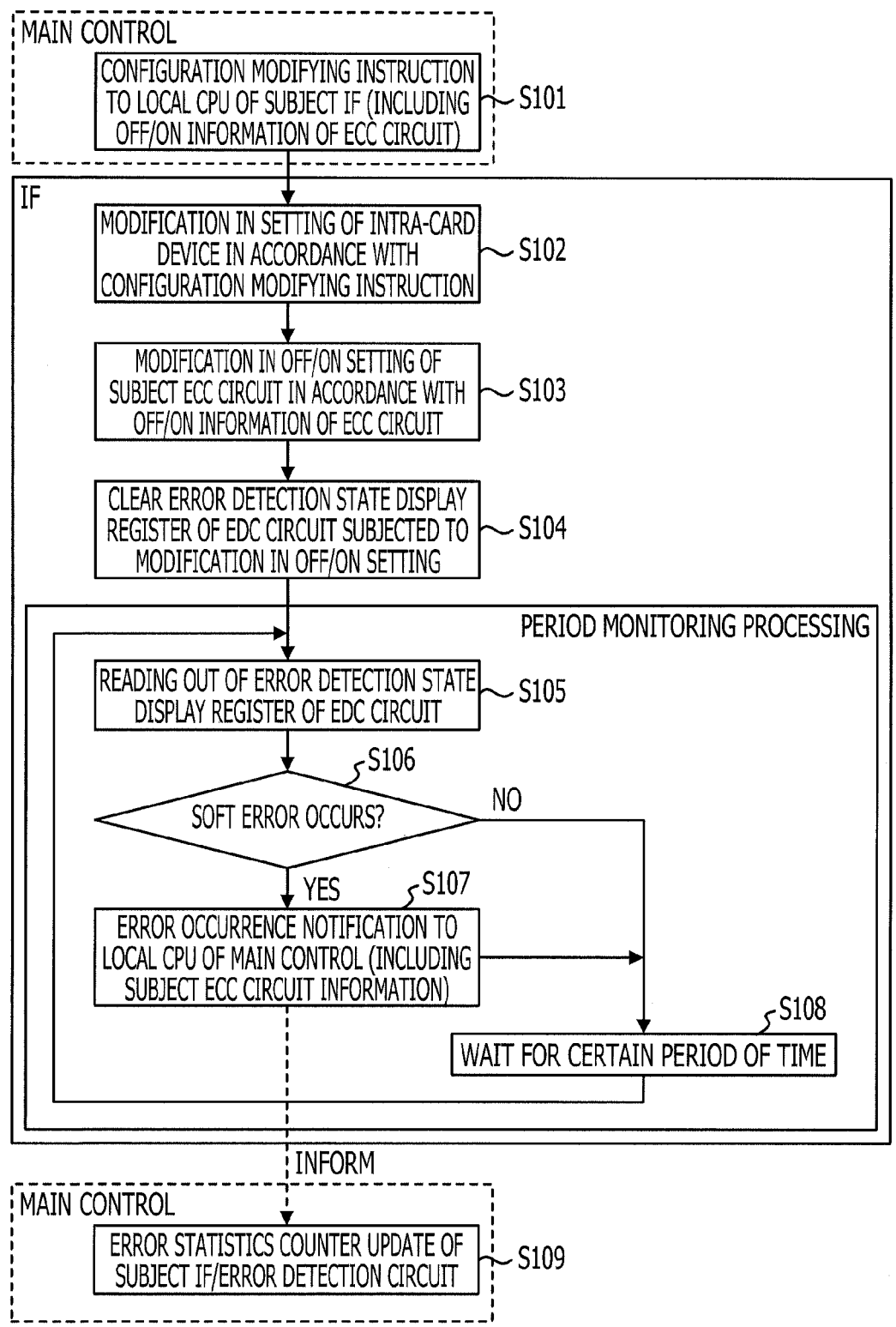
FIG. 8 is a flowchart representing a behavioral example of a second embodiment.

FIG. 8 is a flowchart representing a behavioral example of the second embodiment. In S101 illustrated in FIG. 8, it is assumed that a configuration modifying instruction including information of turning on an error correction circuit in the data buffer 15 of a certain IF card 11, for example, is sent from the local CPU 43 of the main control card 13 to the local CPU 19 of the IF card 11.

In S102, the local CPU 19 of the IF card 11 carries out modification in a setting of a device in the own IF card 11 in accordance with the configuration modifying instruction. Subsequently, in accordance with the turning on/off information included in the configuration modifying instruction, the local CPU 19 turns on (turns on a power supply) the error correction circuit of the data buffer 15 and also carries out control to switch the selectors 22 and 24 (S103). By turning on the power supply, the value of an error detection state display register of the EDC circuit 27 included in the data buffer 15 is cleared (S104).

After that, period monitoring processing of S105 through S108 is carried out. That is, in S105, the local CPU 19 reads out a flag value of the error detection state display register. Subsequently, the local CPU 19 determines whether or not a soft error occurs (whether or not a soft error is detected) (S106). This determination is carried out by whether the flag is off (without an error) or on (with an error).

In a case of not occurring a soft error (in a case of a flag of off), the processing goes on to S108. In contrast, in a case of occurring a soft error (in a case of a flag of on), the local CPU 19 sends an error occurrence notification to the local CPU 43 of the main control card 13 (S107). The error occurrence notification also includes information of the subject error correction circuit. After that, the processing goes on to S108.

In S108, the local CPU 19 clears the error detection state display register and becomes in a wait state for a certain period of time. As a certain period of time has passed, the local CPU 19 carries out the processing in S105.

In S109, the local CPU 43 updates the error statistics counter (value of the error occurrence statistics) to the device equivalent to the data buffer 15 of the subject IF card. In such a manner, in the "error occurrence statistics" of the SER table 41B, a number of detecting soft errors per a certain period of time by the error correction circuit is stored. Such an error occurrence statistics value is used for determining an error correction circuit (ECC circuit) to be turned on or off in S006 or S008 in the first embodiment.

According to the second embodiment, switching the error correction circuit to be turned off is enabled statistically based on the soft error occurrence rate. Thus, an error correction circuit having a small effect of error correction can preferentially be turned off, so that meaningless error correction processing can be avoided to reduce waste of power consumption and also to suppress a delay.

Hereinafter, a third embodiment of the present disclosure is described. Since the third embodiment has some points in common with the first embodiment, the points in common with the first embodiment are omitted from the description and differences from the first embodiment are mainly described.

Figure 9:
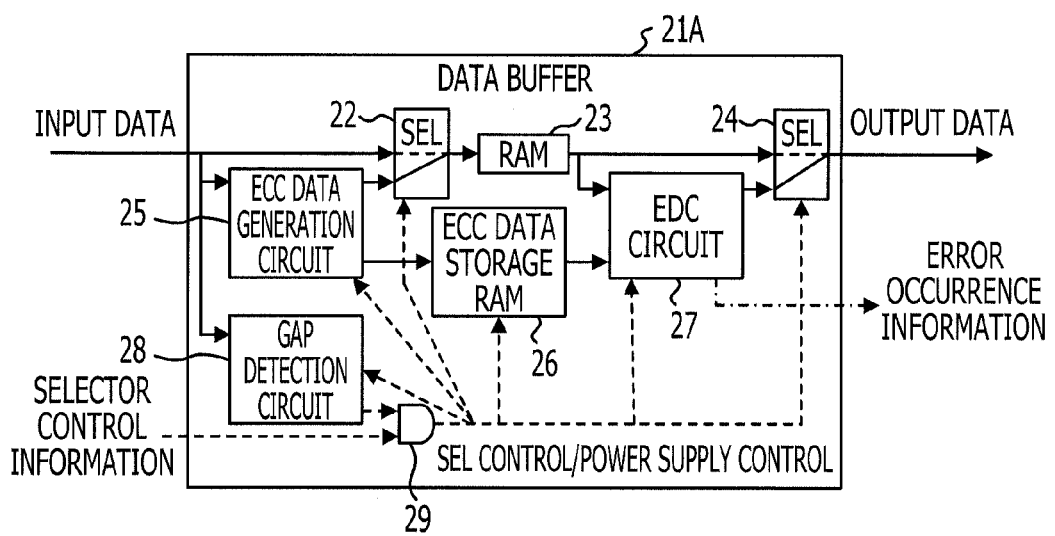
FIG. 9 illustrates an example of a configuration of a data buffer in a third embodiment.

The third embodiment differs from the first embodiment in that the data buffers 21 (FIG. 3) described in the first embodiment are added with components. FIG. 9 illustrates an example of a configuration of a data buffer 21A applied instead of the data buffers 21 in the third embodiment. As illustrated in FIG. 9, the data buffer 21A differs from the data buffer 21 in that a gap detection circuit 28 and an AND circuit 29 is added thereto.

Here, on a main signal line, a signal representing a data block having a predetermined length is serially transmitted as a main signal. The IF cards 11 and the switch cards 12 carry out processing on a data block basis. Between data blocks in the main signal, a region (section) not of effective data is equipped. This region (section) is called as "a gap".

As a main signal (input data) is inputted from the line interface section, the gap detection circuit 28 detects a gap between the data blocks. For example, the gap detection circuit 28 can detect a gap by detecting a particular bit pattern inserted between the effective data blocks. Alternatively, the gap detection circuit 28 can detect a gap by counting pulses of the main signal in accordance with a predetermined clock and distinguishing a data block from a gap based on a number of the counted pulses. As a matter of fact, to an approach to detect a gap, an existing appropriate approach is applicable in accordance with the data structure transmitted as the main signal.

Figure 10A:
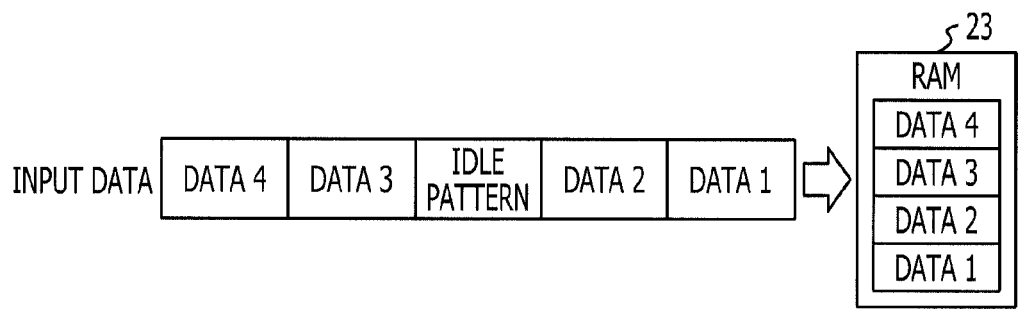
FIG. 10A illustrates an action of a gap detection circuit.
Figure 10B:
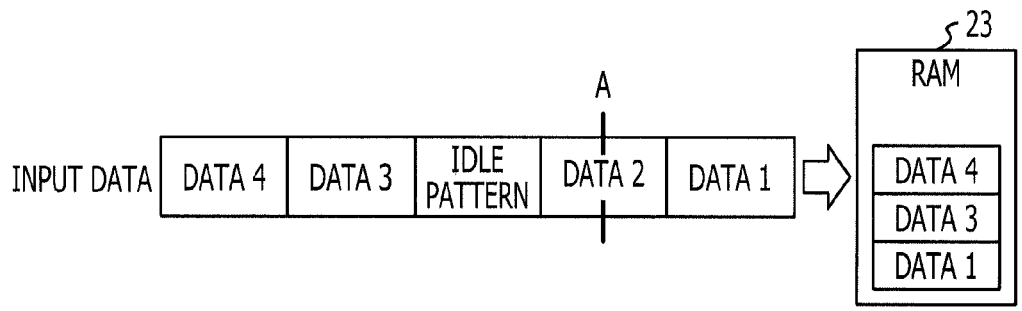
FIG. 10B illustrates another action of the gap detection circuit.
Figure 10C:
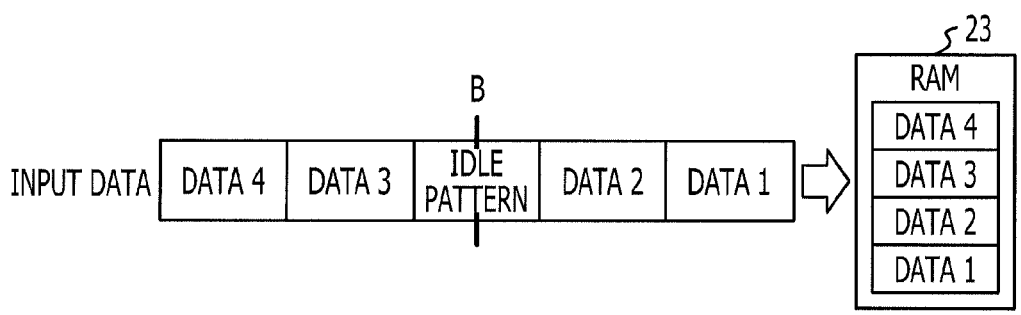
FIG. 10C illustrates still another action of the gap detection circuit.

FIGS. 10A, 10B, and 10C illustrate an action of the gap detection circuit 28. FIG. 10A illustrates a state of storing data blocks in the main signal (input data) and the RAM 23 in a state of not performing switching of the selectors 22 and 24. FIG. 10B illustrates an example of performing switching of the selectors 22 and 24 a switching point A in FIG. 10B. FIG. 10C illustrates an example of performing switching of the selectors 22 and 24 at a switching point B in FIG. 10C.

As illustrated in FIG. 10A, a case is assumed that effective data blocks 1 through 4 (data 1 through 4) are inputted serially as a main signal (input data). Here, in a case that there is a space between the data blocks 2 and 3, a particular bit pattern (idle pattern) representing that there is no effective data block is inserted between the data blocks 2 and 3. This section (idle section) having the idle pattern inserted thereto is equivalent to a gap.

In a case illustrated in FIG. 10A, switching to the selectors 22 and 24 is not performed, so that each of the data blocks 1 through 4 is stored normally in the RAM 23. In contrast, in a case of FIG. 10B, while transferring the data block 2 to the RAM 23, switching of the selectors 22 and 24 is performed. Therefore, the data block 2 becomes an error and is not accumulated normally in the RAM 23. Meanwhile, in a case of FIG. 10C, switching of the selectors 22 and 24 is performed in the gap, that is, the idle section, so that the data blocks 1 through 4 are stored in the RAM 23 normally.

In a case of detecting the idle section as described above, the gap detection circuit 28 inputs a signal representing gap detection (gap detection signal) to the AND circuit 29. The AND circuit 29 has two input terminals. The selector control information (selector control signal) is inputted to one of the input terminals, and the gap detection signal from the gap detection circuit 28 is inputted to the other input terminal. Accordingly, even when the selector control signal is inputted unless the gap detection signal is inputted, the AND circuit 29 does not supplies a selector control/power supply control signal from an output terminal thereof to the selectors 22 and 24 and the error correction circuits (the ECC data generation circuit 25, the ECC data storage RAM 26, and the EDC circuit 27). Accordingly, switching of the selectors 22 and 24 and power supply control to the error correction circuit become executed only in the gap.

Hereinafter, a behavioral example in the third embodiment is illustrated. The local CPU 19 of each IF card 11 and the local CPU 35 of each switch card 12 output selector control information (selector control signal) to turn off error correction processing of the data buffers 21 in accordance with an instruction from the local CPU 43 of the main control card 13.

Meanwhile, in the data buffers 21, until the gap detection circuit 28 detects an idle pattern (gap), the selector control/power supply control signal is not supplied to the selectors 22 and 24 and the error correction circuit.

With that, switching of the selectors 22 and 24 or stopping of a power supply to the error correction circuit is not carried out at a timing of setting the main control card 13, and the switching of the selectors and the stopping of a power supply are executed at a timing of detecting an idle section by the gap detection circuit 28.

According to the third embodiment, in addition to the effects described in the first embodiment, in a case that a device configuration is modified in operation, the reliability can also be enhanced by turning off the error correction circuit without accompanying an error in user data (data block).

The above third embodiment describes a configuration in which information related to a number of soft errors occurring in a certain period of time is stored in the SER database 41 as the error occurrence statistics. Instead of such a configuration, each card device may also store information related to a number of soft errors for each error correction circuit to inform the local CPU 43 of the number of soft errors per a predetermined period (certain period of time) by the local CPU, thereby storing information related to an accumulated value of the number of soft errors in the SER database 41 (subject SER table).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A plug-in card storage device comprising:
   a plug-in card including a memory to store received input data and an error correction circuit to be equipped electrically connectable to the memory and to correct an error in input data outputted from the memory;
   a device body to have the plug-in card implemented therein; and
   a processor to determine whether or not to activate the error correction circuit, by calculating a reliability index value of the plug-in card based on an error rate of the memory provided in the plug-in card implemented in the device main body, so as to approximate the reliability index value to a reference value;
   wherein the reliability index value is at least one of a card error rate and an average failure time of the plug-in card storage device, the card error rate is obtained by adding a hard failure rate of the plug-in card and a hard failure rate of the device body and a soft error rate of the memory, and the average failure time is an inverse of the card error rate.

2. The plug-in card storage device according to claim 1, wherein
   the plug-in card further includes a plurality of memories, and
   the reliability index value of the plug-in card is calculated based on respective error rates of the plurality of memories and an installation environmental parameter of the plug-in card storage device.

3. The plug-in card storage device according to claim 1, wherein the processor
   receives occurrence information of an error occurring in the error correction circuit from the plug-in card,
   generates error statistics information from the received occurrence information of an error, and
   determines whether or not to activate the error correction circuit based on the error statistics information.

4. The plug-in card storage device according to claim 1, wherein the plug-in card further includes:
   a switch circuit to electrically connect the error correction circuit to the memory; and
   a regulator circuit to regulate switching timing from non-connection to connection by the switch circuit not to impair the input data to be stored in the memory by the electrical connection.

5. The plug-in card storage device according to claim 1, wherein
   the plug-in card includes a plug-in card for working and a plug-in card for protection, and the processor makes an error correction circuit of the plug-in card for protection unconnected to the memory.

6. The plug-in card storage device according to claim 1, wherein
the reliability index value is calculated based on a value multiplied by a soft error rate of the memory and multiplied by a factor determined based on an installation position of the plug-in card storage device.

7. The plug-in card storage device according to claim 1, wherein
the reliability index value is calculated based on a hard failure rate of the plug-in card and a hard failure rate of the device main body.

8. A method of controlling a plug-in card stored in a plug-in card storage device, comprising:
calculating, based on an error rate of a memory provided in a plug-in card, a reliability index value of the plug-in card; and
determining, using the calculated reliability index value of the plug-in card, whether or not to activate an error correction circuit provided in the plug-in card to approximate the calculated reliability index value to a prescribed value;
wherein the reliability index value is at least one of a card error rate and an average failure time of the plug-in card storage device, the card error rate is obtained by adding a hard failure rate of the plug-in card and a hard failure rate of the device body and a soft error rate of the memory, and the average failure time is an inverse of the card error rate.

9. The method of controlling a plug-in card according to claim 8, wherein
the reliability index value of the plug-in card is calculated based on respective error rates of a plurality of memories and an installation environmental parameter of the plug-in card storage device, the memory being one of the plurality of memories.

10. The method of controlling a plug-in card according to claim 8, wherein
the determining whether or not to activate the error correction circuit includes:
receiving occurrence information of an error occurring in the error correction circuit from the plug-in card;
generating error statistics information from the received occurrence information of an error; and
determining whether or not to activate the error correction circuit based on the error statistics information.

* * * * *

UNITED STATES PATENT AND TRADEMARK OFFICE
CERTIFICATE OF CORRECTION

| | | |
|---|---|---|
| PATENT NO. | : 8,935,566 B2 | Page 1 of 1 |
| APPLICATION NO. | : 13/534551 | |
| DATED | : January 13, 2015 | |
| INVENTOR(S) | : Hideki Matsui et al. | |

It is certified that error appears in the above-identified patent and that said Letters Patent is hereby corrected as shown below:

In the Claims

Column 16, Line 31, In Claim 1, before "body," delete "main".

Column 17, Line 13, In Claim 7, after "device" delete "main".

Signed and Sealed this
Fifth Day of May, 2015

Michelle K. Lee
*Director of the United States Patent and Trademark Office*